United States Patent
Lei et al.

(10) Patent No.: US 12,542,319 B2
(45) Date of Patent: Feb. 3, 2026

(54) SECONDARY BATTERY

(71) Applicant: CONTEMPORARY AMPEREX TECHNOLOGY (HONG KONG) LIMITED, Hong Kong (CN)

(72) Inventors: Yuyong Lei, Ningde (CN); Chengyou Xing, Ningde (CN); Peng Wang, Ningde (CN); Jianxiong Yang, Ningde (CN); Lulu Bai, Ningde (CN); Qichang Cai, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 853 days.

(21) Appl. No.: 17/535,676

(22) Filed: Nov. 25, 2021

(65) Prior Publication Data
US 2022/0085445 A1    Mar. 17, 2022

Related U.S. Application Data

(63) Continuation of application No. PCT/CN2020/087437, filed on Apr. 28, 2020.

(30) Foreign Application Priority Data

May 29, 2019    (CN) .......................... 201920795571.7

(51) Int. Cl.
*H01M 50/15*     (2021.01)
*H01M 50/166*    (2021.01)
(Continued)

(52) U.S. Cl.
CPC ......... *H01M 50/15* (2021.01); *H01M 50/166* (2021.01); *H01M 50/55* (2021.01);
(Continued)

(58) Field of Classification Search
CPC ......... H01M 10/0413; H01M 2220/20; H01M 50/15; H01M 50/564; H01M 50/55;
(Continued)

(56) References Cited

U.S. PATENT DOCUMENTS

2021/0083256 A1*    3/2021    Liu et al. ................ H01M 2/26

FOREIGN PATENT DOCUMENTS

| CN | 105390741 A | 3/2016 |
| CN | 207233791 U | 4/2018 |

(Continued)

OTHER PUBLICATIONS

The extended European search report for European Application No. 20813339.7, dated Apr. 4, 2022, 7 pages.
(Continued)

*Primary Examiner* — Jonathan G Leong
*Assistant Examiner* — Kan Luo
(74) *Attorney, Agent, or Firm* — East IP P.C.

(57) ABSTRACT

A secondary battery is disclosed, including: an electrode unit, including an electrode body and a tab extending from the electrode body, where the tab includes a first part and a second part that are spaced apart along a height direction of the secondary battery; and a top cover assembly, disposed on one side of the electrode body toward the tab, where the top cover assembly includes a top cover body and a hold-down beam, and a positioning bulge is disposed on a first surface of the top cover body toward the electrode unit, a positioning chute is disposed on the positioning bulge, and the hold-down beam is located between the first part and the second part, and is detachably disposed in the positioning chute.

11 Claims, 6 Drawing Sheets

(51) Int. Cl.
  *H01M 50/55*   (2021.01)
  *H01M 50/553*  (2021.01)
  *H01M 50/564*  (2021.01)

(52) U.S. Cl.
  CPC ....... *H01M 50/553* (2021.01); *H01M 50/564* (2021.01); *H01M 2220/20* (2013.01)

(58) Field of Classification Search
  CPC ... H01M 50/553; H01M 50/166; Y02E 60/10; Y02P 70/50; B21D 5/02
  See application file for complete search history.

(56) References Cited

FOREIGN PATENT DOCUMENTS

| | | |
|---|---|---|
| CN | 108281710 A | 7/2018 |
| CN | 1 08428921 A | 8/2018 |
| CN | 207690902 U | 8/2018 |
| CN | 1 09698385 A | 4/2019 |
| CN | 209691835 U | 11/2019 |
| CN | 110767849 A | 2/2020 |
| JP | 2019061779 A | 4/2019 |
| WO | WO201 7194414 A1 | 11/2017 |

OTHER PUBLICATIONS

The International search report for PCT Application No. PCT/CN2020/087437, dated Jul. 29, 2020, 14 pages.

\* cited by examiner

SECONDARY BATTERY

CROSS-REFERENCE TO RELATED APPLICATIONS

This application is a continuation application of International Application No. PCT/CN2020/087437, filed on Apr. 28, 2020 and entitled "SECONDARY BATTERY", which claims priority to Chinese Patent Application No. 201920795571.7, filed on May 29, 2019 and entitled "SECONDARY BATTERY". The disclosures of the aforementioned applications are hereby incorporated by reference in their entireties.

TECHNICAL FIELD

This application relates to the technical field of an energy storage device, and in particular, to a secondary battery.

BACKGROUND

A battery module generally includes a top cover assembly and an electrode unit. An electrode post of the battery module is connected to a tab of the electrode unit by a connecting plate. Constrained by manufacturing, the tab needs to be appropriately long in a manufacturing process of the battery module. After the tab is connected to an adapter strip, the electrode post and the like, the relatively long tab will be folded into a specific space in a tab folding process. This reduces safety performance of the battery module.

Therefore, a new secondary battery is urgently needed.

SUMMARY

An embodiment of this application provides a secondary battery.

An aspect of this application provides a secondary battery, including: an electrode unit, including an electrode body and a tab extending from the electrode body, where the tab includes a first part and a second part that are spaced apart along a height direction of the secondary battery; and a top cover assembly, disposed on one side of the electrode body toward the tab, where the top cover assembly includes a top cover body and a hold-down beam, and a positioning bulge is disposed on a first surface of the top cover body toward the electrode unit, a positioning chute is disposed on the positioning bulge, and the hold-down beam is located between the first part and the second part, and is detachably disposed in positioning chutes of at least two positioning bulges.

According to an aspect of this application, the top cover body is an insulating top cover plate.

Alternatively, the top cover body includes a top cover plate and an insulating plate that are stacked along the height direction. The first surface is disposed on one side of the insulating plate away from the top cover plate.

According to an aspect of this application, two or more positioning bulges are spaced apart along a length direction of the secondary battery, and the second part is located between two adjacent positioning bulges.

According to an aspect of this application, the positioning chute is formed by recessing an inner lateral surface that is of the positioning bulge and that is oriented toward the second part.

According to an aspect of this application, the positioning chute runs through the positioning bulge along the length direction.

According to an aspect of this application, there are three positioning bulges, the three positioning bulges are spaced apart along the length direction, and the second part of each of the two tabs is disposed between the two adjacent positioning bulges.

According to an aspect of this application, the hold-down beam includes two compression sub-beams successively distributed along the length direction, and the two compression sub-beams are located between the first part and the second part of the two tabs respectively, where the two compression sub-beams are integrated structures, or the two compression sub-beams are disposed discretely.

According to an aspect of this application, the two compression sub-beams extend along the height direction at different extension heights to adapt to the second parts of different thicknesses on the electrode unit.

According to an aspect of this application, a hook is disposed on one of the positioning bulge or the hold-down beam, and a notch that fits with the hook is disposed on the other of the positioning bulge or the hold-down beam, so that the hold-down beam is clasped in the positioning chute through the hook and the notch.

According to an aspect of this application, the hold-down beam includes a connecting end located in the positioning chute, the connecting end includes a first outer surface and a second outer surface that are opposite to each other in a thickness direction of the secondary battery, and a bottom surface and a top surface disposed oppositely in the height direction, the first outer surface is located on one side of the second outer surface near the middle of the top cover body, and the hook is formed by protruding out of the first outer surface.

An inner wall face of the positioning bulge toward the positioning chute is recessed to form the notch.

According to an aspect of this application, the top surface is recessed to form a reserved space, a retreat part is disposed in the reserved space, and an inner surface on which the reserved space is formed is recessed toward the first surface to form the retreat part.

According to an aspect of this application, two or more positioning chutes are disposed on the positioning bulge, the two or more positioning chutes are spaced apart in the thickness direction of the secondary battery, there are two or more hold-down beams, and the two or more hold-down beams are disposed alongside in the thickness direction.

The positioning bulge is formed by extending in the thickness direction, or, the positioning bulge includes two or more sub-bulges successively distributed in the thickness direction, and the positioning chute is disposed on each of the two or more sub-bulges.

Another embodiment of this application further provides a battery pack, including the secondary battery.

Still another embodiment of this application further provides a vehicle, including the secondary battery.

DESCRIPTION OF DRAWINGS

Other features, objectives, and advantages of this application are manifested more clearly by the following detailed description of non-restrictive embodiments with reference to accompanying drawings, in which the same or similar features are denoted by the same or similar reference numerals.

REFERENCE NUMERALS

10: Top cover assembly;
100: Top cover body; 100a: Top cover plate; 100b: Insulating plate;
110: First surface; 120: Positioning bulge; 121: Positioning chute; 122: Sub-bulge; 123: Inner lateral surface; 124: Inner wall face; 125: Notch;
200: Hold-down beam;
210: Compression sub-beam;
220: Connecting end; 221: First outer surface; 222: Second outer surface; 223: Bottom surface; 224: Hook; 225: Top surface; 226: Reserved space; 227: Retreat part;
20: Casing;
30: Electrode unit;
31: Tab; 31a: First part; 31b: Second part; 31c: Folded part;
32: Electrode body; and
40: Adapter strip.

DESCRIPTION OF EMBODIMENTS

The following describes features and exemplary embodiments in detail according to each aspect of this application. In the following detailed description, many details are provided to enable a comprehensive understanding of this application. However, it is apparent to a person skilled in the art that this application can be implemented without some of the details. The following description of the embodiments is merely intended to enable a better understanding of this application by illustrating examples of this application. In the accompanying drawings and the following description, at least a part of well-known structures and technologies are omitted to avoid unnecessary ambiguity of this application and, for clarity, the size of some structures may be exaggerated. In addition, the features, structures, or characteristics described below may be combined in one or more embodiments in any appropriate manner.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first" and "second" are merely used for descriptive purposes, but shall not be construed as indicating or implying relative importance.

The directional terms appearing in the following description indicate the directions shown in the drawings, but without limiting specific structures in the embodiments of this application. In the context of this application, unless otherwise expressly specified, the terms "mount" and "connect" shall be understood in a broad sense. For example, a "connection" may be a fixed connection, a detachable connection, or an integrated connection, and may be a direct connection or an indirect connection. A person of ordinary skill in the art can understand the specific meanings of the terms in this application according to specific situations.

In the prior art, a tab needs to be appropriately long in a manufacturing process of a battery module. After the tab is connected to an adapter strip, an electrode post and the like, the relatively long tab will be folded into a specific space in a tab folding process. In actual production, a shape of the folded tab is uncontrollable. The tab will not be bent as designed. Some tabs will be bent, stacked, or directly inserted into an electrode unit to cause a short circuit of the electrode unit.

This application is put forward to solve the problem of the short circuit of the electrode unit caused by insertion of the tab into the electrode unit in the tab folding process.

For a better understanding of this application, the following describes a secondary battery according to embodiments of this application in detail with reference to FIG. 1 to FIG. 10.

Figure 1:
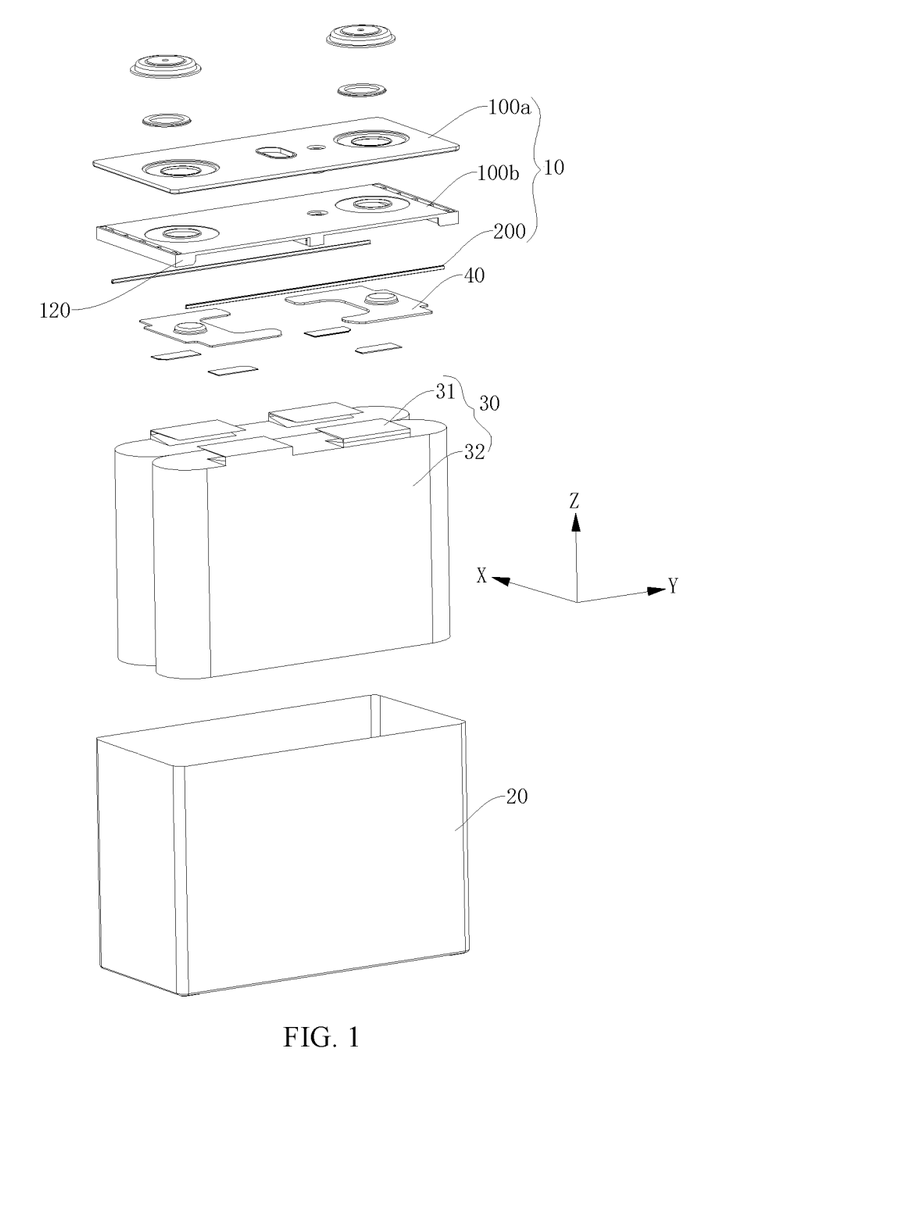
FIG. 1 is an exploded schematic structural diagram of a secondary battery according to an embodiment of this application.
Figure 2:
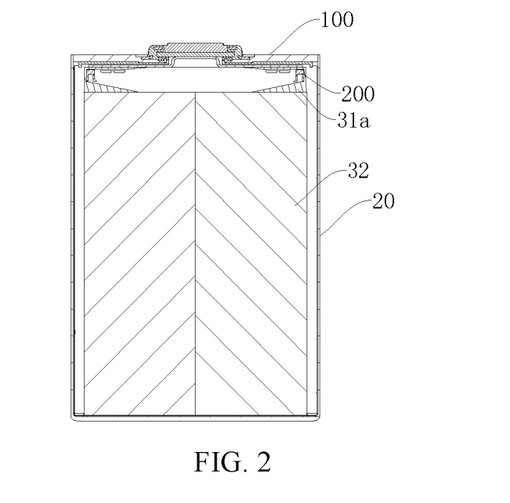
FIG. 2 is a sectional view of a secondary battery according to an embodiment of this application.
Figure 3:
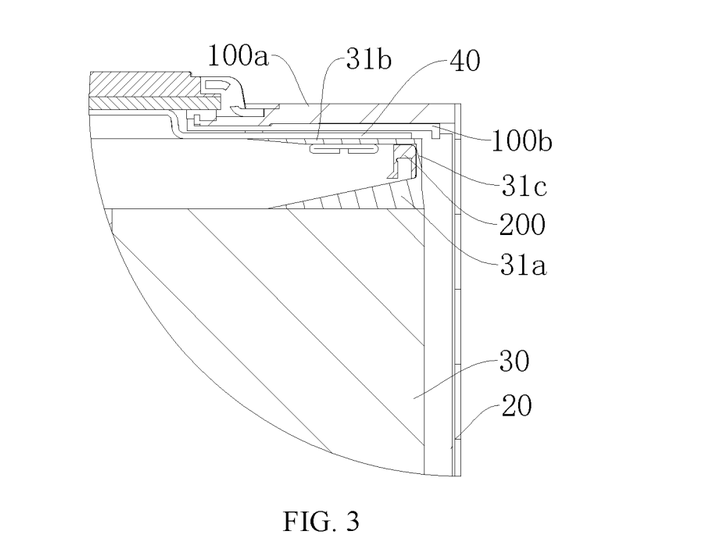
FIG. 3 is a local detailed schematic structural diagram of FIG. 2.
Figure 4:
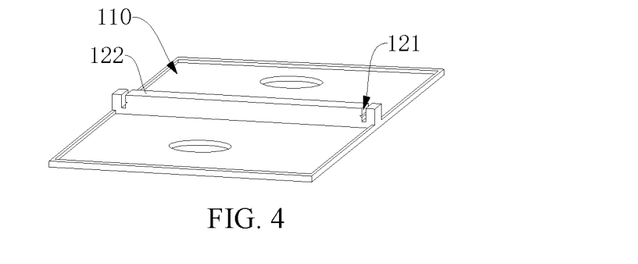
FIG. 4 is a schematic structural diagram of a top cover body of a secondary battery according to an embodiment of this application.

Referring to FIG. 1 to FIG. 4, FIG. 1 is a schematic structural diagram of a secondary battery according to an embodiment of this application; FIG. 2 is a sectional view of a secondary battery; FIG. 3 is a local detailed schematic structural diagram of FIG. 2; and FIG. 4 is a schematic structural diagram of a top cover body of a secondary battery according to an embodiment of this application. The secondary battery includes: an electrode unit 30, including an electrode body 32 and a tab 31 extending from the electrode body 32, where the tab includes a first part 31a and a second part 31b that are spaced apart along a height direction (the Z direction in FIG. 1) of the secondary battery; and a top cover assembly 10, disposed on one side of the electrode body 32 toward the tab 31, where the top cover assembly 10 includes a top cover body 100 and a hold-down beam 200, and a positioning bulge 120 is disposed on a first surface 110 of the top cover body 100 toward the electrode unit 30, a positioning chute 121 is disposed on the positioning bulge 120, and the hold-down beam 200 is located between the first part 31a and the second part 31b, and is detachably disposed in positioning chutes 121 of at least two positioning bulges 120.

In this application, the secondary battery includes the top cover assembly 10 and the electrode unit 30 that are spaced apart, and the tab 31 is located between the electrode body 32 and the top cover assembly 10. The positioning bulge 120 is disposed on one side of the top cover body 100 toward the tab 31. The positioning chute 121 is disposed on the positioning bulge 120. The hold-down beam 200 is detachably disposed in the positioning chute 121. The hold-down beam 200 is located between the first part 31a and the second part 31b. The hold-down beam 200 limits the position of the second part 31b between the hold-down beam 200 and the first surface 110. Therefore, the tab 31 is folded along the hold-down beam 200 during folding, thereby preventing a redundant part of the tab 31 from being inserted into the electrode unit 30. This prevents a short circuit of the electrode unit 30 caused by bending of the second part 31b toward the first part 31a, and ensures safety performance of the secondary battery.

Figure 5:
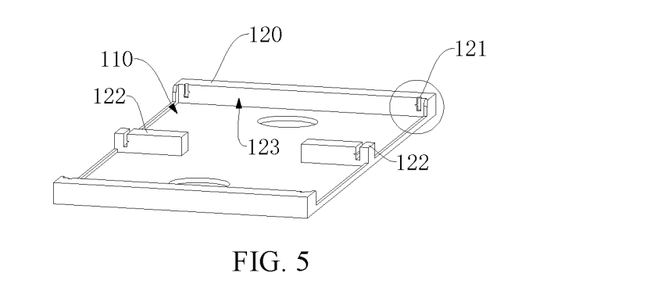
FIG. 5 is a schematic structural diagram of a top cover body of a secondary battery according to another embodiment of this application.

Referring to FIG. 5, in some optional embodiments, there are two or more positioning bulges 120. The two or more positioning bulges 120 are spaced apart along a length direction (the Y direction in FIG. 1) of the secondary battery, and the second part 31b is located between two adjacent positioning bulges 120. In this way, both sides of the second part 31b can be supported by the positioning bulges 120. The two positioning bulges 120 can provide a reserved space for the second part 31b, and prevent the second part 31b from being deformed by extrusion. In addition, the hold-down beam 200 is disposed in the positioning chute 121 of the two positioning bulges 120, thereby ensuring stability of a relative position between the hold-down beam 200 and the top cover body 100.

In some optional embodiments, the secondary battery further includes a casing 20. The casing 20 includes an accommodation cavity and an opening communicating to the accommodation cavity. The electrode unit 30 is located in the accommodation cavity. The tab 31 is oriented toward the opening. The top cover assembly 10 is configured to cover the opening. The top cover assembly 10 and the casing 20 provide better protection for the electrode unit 30.

The top cover body 100 may be disposed diversely. In some optional embodiments, the top cover body 100 is an insulating top cover plate; or, in other optional embodiments, the top cover body 100 includes a top cover plate 100a and an insulating plate 100b that are stacked along a height direction. The top cover plate 100a is located on one side of the insulating plate 100b away from the electrode unit 30, and the first surface 110 is disposed on one side of the insulating plate 100b away from the top cover plate 100a. The disposition manner of the top cover body 100 is not limited to the example described above. Any disposition manner is appropriate as long as the first surface 110 of the top cover body 100 toward the electrode unit 30 is an insulating surface, so as to prevent a short circuit caused by an electrical connection between the tab 31 and the top cover body 100, and improve safety performance of the secondary battery.

The quantity of electrode units 30 is not limited herein. As shown in FIG. 1, there are two electrode units 30. The two electrode units 30 are stacked along the thickness direction (the X direction in FIG. 1) of the secondary battery. The tabs 31 of the two electrode units 30 are spaced apart along the thickness direction.

In such optional embodiments, two positioning chutes 121 are disposed on one positioning bulge 120. The two positioning chutes 121 are spaced apart along the thickness direction. There are two hold-down beams 200. The two hold-down beams 200 are spaced apart along the thickness direction. The two hold-down beams 200 are located between the second part 31b and the first part 31a of the tabs 31 on the two electrode units 30 respectively.

Understandably, the quantity of the electrode units 30 is not limited. For example, the quantity of the electrode units 30 may be three or more, and the three or more electrode units 30 are stacked along the thickness direction. The quantity of the positioning chutes 121 on the positioning bulge 120 is not limited. The quantity of the positioning chutes 121 may be three or more, and the quantity of the hold-down beams 200 may also be three or more. Any quantity is appropriate as long as the hold-down beam 200 can be located between the first part 31a and the second part 31b of the tab 31 on the electrode unit 30, so as to prevent the short circuit of the electrode unit 30 caused by the bending of the second part 31b toward the first part 31a.

When there are two or more positioning chutes 121 on the positioning bulge 120, the positioning bulge 120 may be disposed diversely. For example, the positioning bulge 120 is formed by extending in the thickness direction, and two or more positioning chutes 121 are disposed on one positioning bulge 120. Alternatively, the positioning bulge 120 includes two or more sub-bulges 122 successively distributed along the thickness direction, and the positioning chute 121 is disposed on each of the two or more sub-bulges 122.

Still referring to FIG. 5, there are three positioning bulges 120. The three positioning bulges 120 include: two integrated positioning bulges 120 disposed on two sides of the first surface 110 along the length direction, and two sub-bulges 122 disposed between the two integrated positioning bulges 120. The two sub-bulges 122 are spaced apart along the thickness direction, thereby reducing the space occupied by the positioning bulges 120 and reserving a space for parts such as an explosion-proof valve on the top cover assembly 10.

Figure 6:
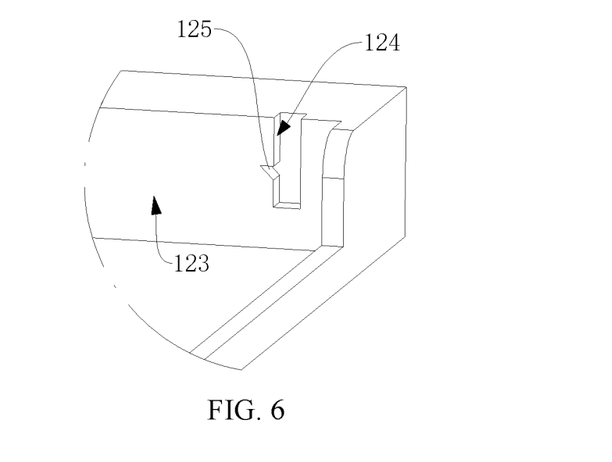
FIG. 6 is a local detailed schematic structural diagram of FIG. 5.

Referring to FIG. 6, the positioning chute 121 may be disposed diversely. For example, the positioning chute 121 may be formed by recessing an inner lateral surface 123 that is of the positioning bulge 120 and that is oriented toward the tab 31; or, the positioning chute 121 runs through the positioning bulge 120 along the length direction.

Still referring to FIG. 5, the positioning chutes 121 disposed on the positioning bulges 120 on two sides of the first surface 110 are formed by recessing the inner lateral surface 123 of the positioning bulges. That is, the positioning chutes 121 do not run through the positioning bulges 120. The positioning chutes 121 and the positioning bulges 120 limit the position of the hold-down beam 200, so that the hold-down beam 200 is squeezed between the two positioning bulges 120 on two sides. The positioning chute 121 on the sub-bulge 122 located in the middle of the first surface 110 runs through the sub-bulge, so as to facilitate quick installation of the hold-down beam 200.

The tab 31 on the same electrode unit 30 may be disposed diversely. For example, the two tabs 31 of the electrode unit 30 are located on the same side of the electrode body 32, and the same hold-down beam 200 is located between the first part 31a and the second part 31b of both tabs 31 on the electrode unit 30. Alternatively, the two tabs 31 of the electrode unit 30 are disposed on two sides of the electrode body 32 respectively, and therefore, the two hold-down beams 200 are located between the first part 31a and the second part 31b of the two tabs 31 respectively.

In some optional embodiments, in order to reduce the quantity of the hold-down beams 200 and simplify the structure of the secondary battery, the two tabs 31 of the electrode unit 30 are located on the same side of the electrode body 32, and there are three positioning bulges 120. The three positioning bulges 120 are spaced apart along the length direction. The second part 31b of each of the two tabs 31 is located between two adjacent positioning bulges 120. The hold-down beams 200 are detachably disposed in the positioning chutes 121 of the three positioning bulges 120, and the hold-down beams 200 are located between the second part 31b and the first part 31a of the two tabs 31 respectively, thereby preventing the second parts 31b of the two tabs 31 from deforming toward the first part 31a.

Figure 7:
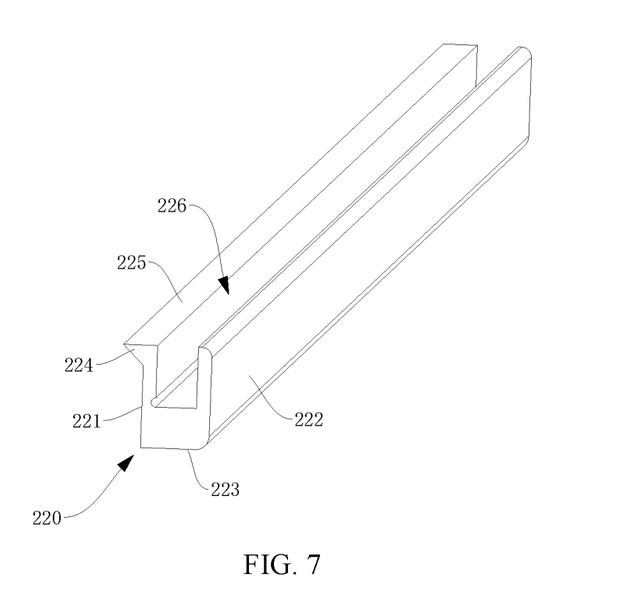
FIG. 7 is a schematic structural diagram of a hold-down beam of a secondary battery according to an embodiment of this application.
Figure 8:
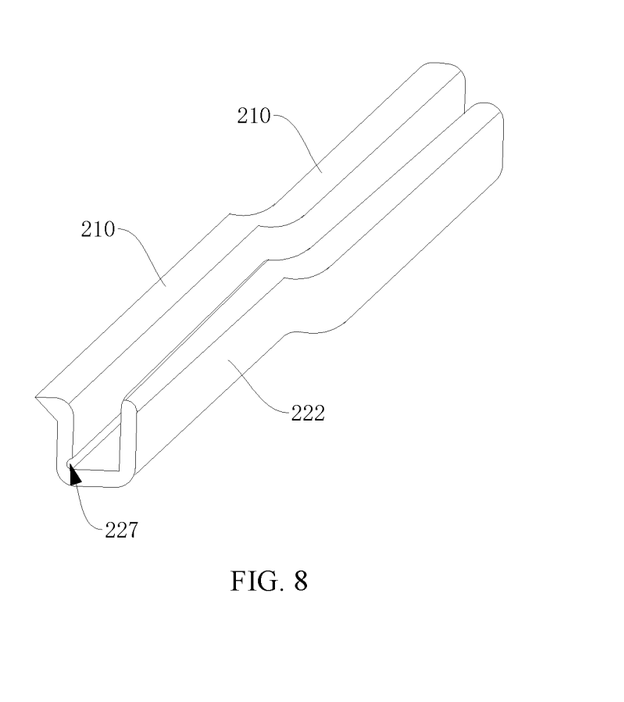
FIG. 8 is a schematic structural diagram of a hold-down beam of a secondary battery according to another embodiment of this application.
Figure 9:
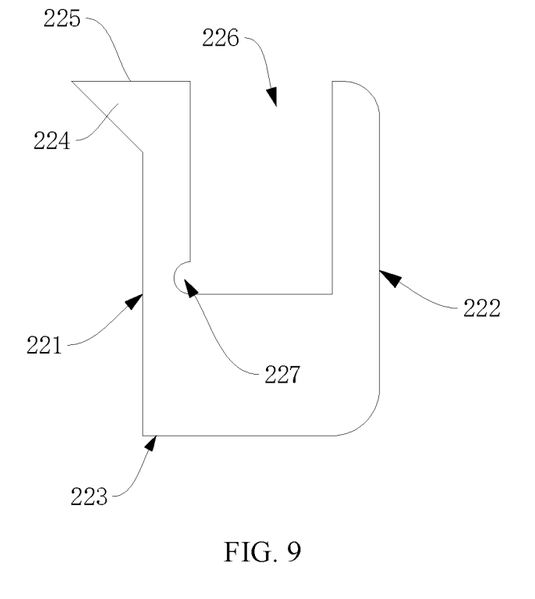
FIG. 9 is a side view of a hold-down beam of a secondary battery according to an embodiment of this application.

Referring to FIG. 7 to FIG. 9, the hold-down beam 200 may be disposed diversely. In some optional embodiments, the hold-down beam 200 includes two compression sub-beams 210 successively distributed along the length direction. The two compression sub-beams 210 are located between the first part 31a and the second part 31b of the two tabs 31 respectively. The two compression sub-beams 210 are integrated structures, or the two compression sub-beams 210 are disposed discretely.

In the optional embodiments, the positive and negative tabs 31 of the electrode unit 30 are located on one side of the electrode body 32, and the same hold-down beam 200 is located between the first part 31a and the second part 31b of both a positive tab 31 and a negative tab 31 concurrently. Therefore, the hold-down beam 200 includes two compression sub-beams 210 so that two compression sub-beams 210 can be conveniently disposed for the two tabs 31 respectively.

The two compression sub-beams 210 may have the same structure or different structures. In some optional embodiments, the two compression sub-beams 210 extend along the height direction at different extension heights to adapt to the second parts 31b of different thicknesses on the electrode unit 30.

In the same electrode unit 30, the positive and negative tabs 31 are made of different materials, thereby possibly leading to different thicknesses between the positive and negative tabs 31. Therefore, the thickness of the second part 31b may differ between the two tabs 31, and the extension height along the height direction differs between the two compression sub-beams 210, thereby being adaptable to the second parts 31b of different thicknesses on the electrode unit 30. This ensures that the second parts 31b of the two tabs 31 closely fit with the two compression sub-beams 210 respectively, and ensures stability of the relative position between each second part 31b and the first surface 110 and the compression sub-beams 210.

In any of the above embodiments, the hold-down beam 200 may be detachably connected to the positioning bulge 120 diversely. For example, an interference fit is achieved between the hold-down beam 200 and the positioning chute 121, so as to ensure the stability of the relative position between the hold-down beam 200 and the positioning bulge 120 when the hold-down beam 200 is located in the positioning chute 121.

In other optional embodiments, a hook 224 is disposed on one of the positioning bulge 120 or the hold-down beam 200, and a notch 125 that fits with the hook 224 is disposed on the other thereof, so that the hold-down beam 200 is clasped in the positioning chute 121 through the hook 224 and the notch 125. The positioning bulge 120 is clasped to the hold-down beam 200 to increase the stability of the relative position between the positioning bulge 120 and the hold-down beam 200.

In some optional embodiments, the hold-down beam 200 includes a connecting end 220 located in the positioning chute 121. The connecting end 220 includes a first outer surface 221 and a second outer surface 222 that are opposite to each other in a thickness direction, and a bottom surface 223 and a top surface 225 disposed oppositely in the height direction. The first outer surface 221 is located on one side of the second outer surface 222 near the middle of the top cover body 100. The hook 224 is formed by protruding out of the first outer surface 221. The inner wall face 124 of the positioning bulge 120 toward the positioning chute 121 is recessed to form the notch 125.

Generally, a structure of the hold-down beam 200 is relatively small. If more notches are opened on the hold-down beam 200, the strength of the hold-down beam 200 will be reduced. However, an extension distance of the positioning chute 121 on the positioning bulge 120 is rather limited, and a sufficient space is available on the positioning bulge 120 for opening more notches. In this embodiment, the hook 224 is disposed on the hold-down beam 200, and the notch 125 is disposed in the positioning chute 121, thereby ensuring stability of the clasp connection between the hold-down beam 200 and the positioning bulge 120 while ensuring the strength of the hold-down beam 200.

In addition, the hook 224 on the hold-down beam 200 is formed by protruding out of the first outer surface 221. The first outer surface 221 is disposed near the middle of the top cover body 100. During the fitting between the hold-down beam 200 and the tab 31, the first outer surface 221 does not contact the tab 31, so that the hook 224 on the hold-down beam 200 will not scratch the tab 31.

In some optional embodiments, the tab 31 further includes a folded part 31c connected between the first part 31a and the second part 31b. The hold-down beam 200 and the folded part 31c are disposed alongside in the thickness direction. On the hold-down beam 200, the second outer surface 222 and the bottom surface 223 are sleekly connected, and the top surface 225 and the second outer surface 222 are sleekly connected. The sleek transition of the outer surface through which the hold-down beam 200 contacts the folded part 31c prevents the hold-down beam 200 from scratching the folded part 31c and ensures the strength of the tab 31.

Further, in some optional embodiments, the top surface 225 is recessed to form a reserved space 226. A retreat part 227 is disposed in the reserved space 226. An inner surface on which the reserved space 226 is formed is recessed toward the first surface 110 to form the retreat part 227.

In the optional embodiments, the retreat part 227 is also disposed at the connecting end 220. When the hold-down beam 200 is clasped into the positioning chute 121, the retreat part 227 can increase deformability of the connecting end 220, thereby facilitating connection between the hold-down beam 200 and the positioning bulge 120.

Further, in some optional embodiments, a through-hole for accommodating an electrode post of the secondary battery is disposed on the top cover body 100. The secondary battery further includes an adapter strip 40 located between the second part 31b and the first surface 110. The electrode post is disposed in the through-hole, the adapter strip 40 is connected to the electrode post, and the second part 31b is connected to the adapter strip 40. In this way, the second part 31b is connected to the electrode post through the adapter strip 40, and electric energy in the electrode body 32 flows to the electrode post through the tab 31 and the adapter strip 40.

Figure 10:
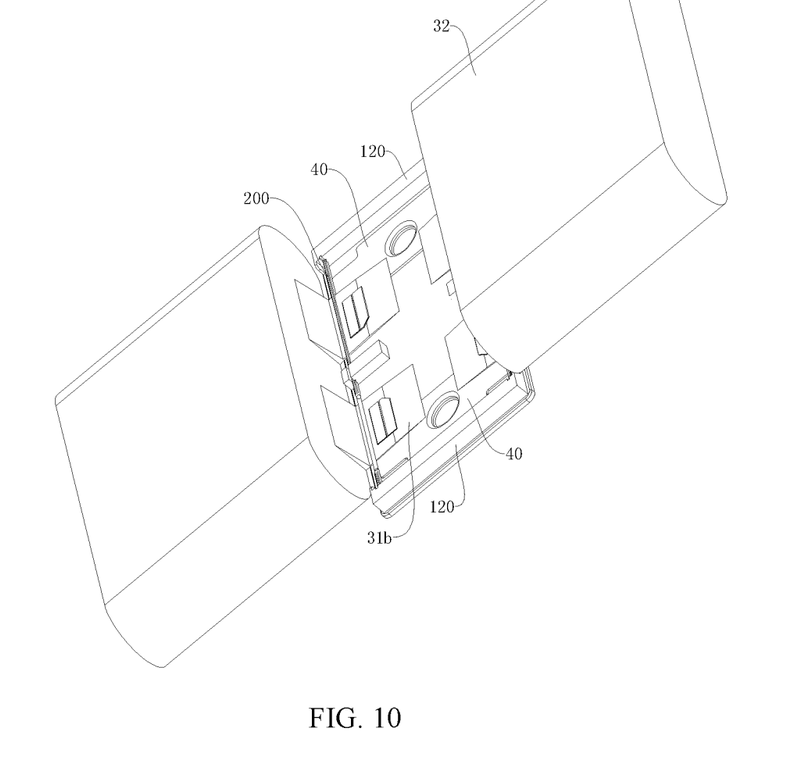
FIG. 10 is a schematic diagram of an assembly process of a secondary battery according to an embodiment of this application.

Referring to FIG. 10, a manufacturing process of a secondary battery is described below briefly:

The tab 31 is led out of the electrode body 32. At this time, the first part 31a closely fits a surface of the electrode body 32. That is, the first part 31a is connected between the electrode body 32 and the second part 31b, and the second part 31b and the folded part 31c are at a preset angle to the surface of the electrode body 32. In some optional embodiments, the second part 31b and the folded part 31c are at a ninety-degree angle to the surface of the electrode body 32.

The adapter strip 40 is disposed on the first surface 110 of the top cover body 100.

Two electrode units 30 are disposed on two sides of the top cover assembly 10 respectively, and the second parts 31b of the two tabs 31 closely fit the adapter strip 40 on the top cover assembly 10. The second part 31b is connected to the adapter strip 40 by laser welding or by using other technologies.

As shown in FIGS. 5, 6 and 10, the hold-down beam 200 fits into the positioning chute 121, and the hook 224 on the hold-down beam 200 is clasped to the notch 125 in the positioning chute 121. In a process of assembling the hold-down beam 200, the retreat part 227 increases the deformability of the hold-down beam 200. In this way, the connecting end 220 can slide along the chute and the notch 125 fits with the hook 224.

The tab 31 is bent so that the second part 31b and the first part 31a are spaced apart along the height direction.

This application may be implemented in other specific forms without departing from the spirit and essential features hereof. For example, an algorithm described in a specific embodiment may be modified, with a system architecture not departing from the basic spirit of this application. Therefore, the embodiments described herein are exemplary rather than restrictive in all aspects. The scope of this application is defined by the claims appended hereto rather than the foregoing description. This application is intended to cover any modifications and variations hereto provided that they fall in the scope of protection defined by the following claims or their equivalents.

What is claimed is:

1. A secondary battery, comprising:
    an electrode unit, comprising an electrode body and a tab extending from the electrode body, wherein the tab comprises a first part and a second part that are spaced apart along a height direction of the secondary battery; and
    a top cover assembly, disposed on one side of the electrode body toward the tab, wherein
    the top cover assembly comprises a top cover body and a hold-down beam, and a positioning bulge is disposed on a first surface of the top cover body toward the electrode unit, a positioning chute is disposed on the positioning bulge, and the hold-down beam is positioned between the first part and the second part, and is detachably disposed in the positioning chute;
    a hook is disposed on the hold-down beam, and a notch that fits with the hook is disposed on the positioning bulge, so that the hold-down beam is clasped in the positioning chute through the hook and the notch;
    the hold-down beam comprises a connecting end located in the positioning chute, the connecting end comprises a first outer surface and a second outer surface that are opposite to each other in a thickness direction of the secondary battery, and a bottom surface and a top surface disposed oppositely in the height direction, the first outer surface is located on one side of the second outer surface that is near the middle of the top cover body, and the hook is formed by protruding out of the first outer surface;
    an inner wall face of the positioning bulge toward the positioning chute is recessed to form the notch; and
    the top surface is recessed to form a reserved space, a retreat part is disposed in the reserved space, and an inner surface on which the reserved space is formed is recessed toward the first surface to form the retreat part.

2. The secondary battery according to claim 1, wherein
    the top cover body is an insulating top cover plate; or
    the top cover body comprises a top cover plate and an insulating plate that are stacked along the height direction, and the first surface is disposed on one side of the insulating plate away from the top cover plate.

3. The secondary battery according to claim 1, wherein there are two or more positioning bulges, the two or more positioning bulges are spaced apart along a length direction of the secondary battery, and the second part is located between two adjacent positioning bulges.

4. The secondary battery according to claim 1, wherein the positioning chute is formed by recessing an inner lateral surface that is of the positioning bulge and that is oriented toward the second part.

5. The secondary battery according to claim 1, wherein the positioning chute runs through the positioning bulge along the length direction.

6. The secondary battery according to claim 1, wherein there are three positioning bulges, the three positioning bulges are spaced apart along the length direction, and the second part of each of the two tabs is disposed between the two adjacent positioning bulges.

7. The secondary battery according to claim 6, wherein
    the hold-down beam comprises two compression sub-beams successively distributed along the length direction, and the two compression sub-beams are located between the first part and the second part of the two tabs respectively, wherein
    the two compression sub-beams are integrated structures, or the two compression sub-beams are disposed discretely.

8. The secondary battery according to claim 7, wherein the two compression sub-beams extend along the height direction at different extension heights to adapt to the second parts of different thicknesses on the electrode unit.

9. The secondary battery according to claim 1, wherein
    two or more positioning chutes are disposed on the positioning bulge, the two or more positioning chutes are spaced apart in the thickness direction of the secondary battery, there are two or more hold-down beams, and the two or more hold-down beams are disposed alongside in the thickness direction; and
    the positioning bulge is formed by extending in the thickness direction, or, the positioning bulge comprises two or more sub-bulges successively distributed in the thickness direction, and the positioning chute is disposed on each of the two or more sub-bulges.

10. A battery pack, comprising the secondary battery according to claim 1.

11. A vehicle, comprising the secondary battery according to claim 1.

* * * * *